United States Patent [19]

Hooper

[11] Patent Number: 5,795,255
[45] Date of Patent: Aug. 18, 1998

[54] EXTERNALLY ADJUSTABLE CAM ARM

[76] Inventor: John P. Hooper, 402 Washington Rd., Goshen, N.H. 03752

[21] Appl. No.: 749,320

[22] Filed: Nov. 14, 1996

[51] Int. Cl.$^6$ ................................................. F16H 59/36
[52] U.S. Cl. ................................................. 474/14; 474/70
[58] Field of Search ................................ 424/9, 10, 11, 424/12, 13, 14, 69, 70

[56] References Cited

U.S. PATENT DOCUMENTS

| | | | |
|---|---|---|---|
| 3,916,707 | 11/1975 | Wells | 474/14 |
| 3,971,263 | 7/1976 | Beaudoin et al. | 474/14 |
| 3,996,811 | 12/1976 | Reese | 474/14 |
| 4,052,908 | 10/1977 | Takagi et al. | 474/14 |
| 4,095,479 | 6/1978 | Lundberg | 74/230.17 E |
| 4,289,101 | 9/1981 | Knorreck | 123/364 |
| 4,575,363 | 3/1986 | Burgess et al. | 474/14 |
| 4,826,467 | 5/1989 | Reese et al. | 474/14 |
| 5,326,330 | 7/1994 | Bostelmann | 474/14 |
| 5,562,555 | 10/1996 | Peterson | 474/14 |
| 5,692,982 | 12/1997 | Peterson | 474/14 |

OTHER PUBLICATIONS

Clutch Tuning Handbook, Olav Aaen, copyright 1986, revised 1989.

Xerographic depiction of two commerically available Yamaha flyweights.

Yamaha Parts Catalog, Model Year 1992 PZ480S, pp. A-1, C-1.

*Primary Examiner*—Charles A. Marmor
*Assistant Examiner*—Matthew A. Kaness
*Attorney, Agent, or Firm*—Michael J. Weins

[57] ABSTRACT

An adjustable mass cam arm for use in a rotary speed regulation device such as a belt drive torque converter is described. The cam arm has a base region and an elongated centrifugal mass region extending therefrom, the centrifugal mass region terminating in a proximal end which is attached to the base region. The cam arm has an internal cavity which in turn has a cavity opening which is located in the proximal end of the centrifugal mass region, and is readily accessible when the cam arm is installed in the torque converter. Mass can be installed in the internal cavity to add mass to the cam arm, thereby allowing for changing the moment of inertia of the cam arm. In a preferred embodiment, the internal cavity is elongated, and one or more weights are provided, having different masses and/or densities, for selective installation into the elongated cavity. In another further preferred embodiment, the elongated cavity and the one or more weights are threaded. It is further preferred for a cleaning passage to be provided to facilitate removal of debris from the elongated cavity.

19 Claims, 6 Drawing Sheets

EXTERNALLY ADJUSTABLE CAM ARM

FIELD OF THE INVENTION

The present invention relates to a cam arm for use in rotational speed regulation devices which has particular utility for use in variable speed belt drive torque converters. More particularly, the invention relates to a variable mass cam arm which can be adjusted while installed in a belt drive variable speed torque converter. This invention is earlier described in Disclosure Document No. 390,615, recorded Jan. 22, 1996.

BACKGROUND OF THE INVENTION

Variable speed belt drive torque converters are frequently employed in snowmobiles for transferring engine torque to a drive shaft via a belt. U.S. Pat. No. 3,939,720, incorporated herein by reference, teaches one example of such a torque converter. FIGS. 1 and 2 of the present application show a rudimentary example of a prior art belt drive torque converter 10, with FIG. 2 being an exploded view of FIG. 1. The torque converter 10 has a fixed face 12, which is affixed to a coaxial stem 14, which in turn is typically coupled to the driver of an engine. For purposes of discussion, the fixed face 12 will be considered to define the front of the torque converter 10, with the stem 14 extending rearward from the fixed face 12.

The torque converter 10 also has a moveable face 16, which slidably engages the stem 14 so as to be coaxial with and movable with respect to the fixed face 12. The fixed face 12 and the moveable face 16 are both shallow conical faces with their vertices opposed.

A spider casting 18 is fixably positioned on the stem 14, rearward of the moveable face 16, and is thus maintained in a fixed spaced apart relationship to the fixed face 12 with the moveable face 16 positioned therebetween. The spider casting 18 illustrated is roughly triangular in shape, with three lobes 20 spaced 120° apart from each other.

The rear side of the moveable face 16 is provided with three cam arm brackets 24, attached to the moveable face 16 and each positioned to correspond to one of the lobes 20 of the spider casting 18. A cam arm 26 is pivotably attached to each of the cam arm brackets 24 by a pivot pin 28 (as best illustrated in FIG. 2). Each of the cam arms 26 has a cam surface 30 positioned to engage the spider casting 18.

The rear side of the moveable face 16 is also provided with three pairs of spacer posts 32 which project rearward, each pair of spacer posts 32 being positioned to straddle a corresponding one of the cam arm brackets 24. The paired spacer posts 32 slidably engage the lobes 20 of the spider casting 18 and act as guides for the lobes 20 as the moveable face 16 moves axially with respect to the spider casting 18 and fixed face 12.

The arrangement of the spider casting 18, the cam arm brackets 24, and the paired spacer posts 32 limits access to the cam arms 26 when the torque converter 10 is assembled, as is shown in the non-exploded view of FIG. 1. However, the torque converter 10 does have three viewing windows 36 through which the corresponding cam arms 26 may be radially accessed. Each of the viewing windows 36 of the torque converter 10 illustrated is defined by the rear side of the moveable face 16, the corresponding cam arm bracket 24, and the spider casting 18, which collectively form the border of the viewing window 36. Each of the viewing windows 36 allows access to a portion of the corresponding cam arm 26.

The torque converter 10 illustrated in FIGS. 1 and 2 has been simplified for clarity, and does not include additional structural elements provided to increase the rigidity of the resulting torque converter. In a conventional torque converter 10', such as is illustrated in FIG. 3, the spacer posts 32' are provided with bracing webs 33 which span between the pairs of spacer posts 32' to increase the rigidity of the resulting torque converter 10'. Frequently, the cam arm brackets 24', the spacer posts 32', and the bracing webs 33 are formed as integral parts. Additionally, the spider casting 18' will typically include a downward extending web 35 to increase its rigidity. These additional structural elements will further limit non-radial access to the cam arms 26, interfering with non-radial access to the cam arms 26 when the torque converter 10 is assembled.

Referring again to FIGS. 1 and 2, a cover plate 40 is affixed to the spacer posts 32, and is thus maintained at a fixed separation from the rear of the moveable face 16, with the spider casting 18 being positioned therebetween. The cover plate 40 also slidably engages the stem 14.

A compression spring 42 resides between the spider casting 18 and the cover plate 40, and surrounds the stem 14. The compression spring 42 engages the spider casting 18 and the cover plate 40 and biasses them towards a maximum separation from each other, thereby biassing the moveable face 16 towards a maximum separation from the fixed face 12.

When the cam arms 26 are installed in the torque converter 10, the cam surfaces 30 are positioned to engage the spider casting 18. When the torque converter 10 is rotated, the cam arms 26 move from a rest position to an operating position and exert a force on the spider casting 18 countering the force of the spring 42. When the cam arms 26 are in the rest position, the moveable face 16 is positioned at a minimum separation from the spider casting 18, and the separations between the spider casting 18 and the cover plate 40 and between the moveable face 16 and the fixed face 12 are at their maximums.

FIG. 4 is an isometric view which illustrates one typical example of the cam arms 26 used in the prior art. Since the cam arms 26 are designed to be interchangeable, discussion will be in terms of a single cam arm 26.

The cam arm 26 has a base region 50 and an elongated centrifugal mass region 52 extending therefrom. A pivot axis 54 passes through the base region 50, and a pivot pin passage 56 is provided, which is aligned with the pivot axis 54. The cam arm 26 is pivotably mounted in the torque converter 10 by the pivot pin 28 (shown in FIG. 2), which passes through the pivot pin passage 56 and one of the cam arm brackets 24 on the rear of the moveable face 16. The cam arm bracket 24 is positioned such that the cam arm 26 will be radially mounted, and the pivot axis 54 of the cam arm 26 will be perpendicular to the cam arm 26 when it is installed in the torque converter 10, as is best shown in FIG. 2.

Referring again to FIG. 4, the centrifugal mass region 52 of the cam arm 26 has a longitudinal axis 58 and terminates in a proximal end 60, which is viewable through the viewing window 36 and is attached to the base region 50 of the cam arm 26, and a distal end 62, which forms a free end of the centrifugal mass region 52. The cam surface 30 forms the rearward edge of the centrifugal mass region 52. The longitudinal axis 58 of the centrifugal mass region 52 is normal to the pivot axis 54 and is offset therefrom.

The centrifugal mass region 52 is offset from the pivot axis 54 sufficiently that the center of gravity 64 of the cam arm 26 will reside rearward of the pivot axis 54 when the torque converter 10 is stationary. With such a distribution of mass, the cam arm 26 is pivoted towards the spider casting 18 (shown in FIGS. 1 and 2) by centrifugal force when the torque converter 10 is rotated. The force of the pivoting of the cam arm 26 is proportional to the centrifugal force, and therefore is a function of the moment of inertia of the cam arm 26 about the pivot axis 54 and the speed of rotation of the torque converter 10. The cam surface 30 of the cam arm 26 slidably and forcibly engages the spider casting 18, moving it towards the cover plate 40, against the bias of the compression spring 42. At the point where the compressive force of the compression spring 42 counters the force of the cam arm 26, the cam arm 26 is in the operating position, thus the operating position of the cam arm 26 will be dependent on the moment of inertia of the cam arm 26 and the speed of rotation of the torque converter 10. The reduction in separation between the spider casting 18 and the cover plate 40 results in the moveable face 16 being forced towards the fixed face 12, the separation therebetween decreasing as the rotational speed is increased.

The fixed face 12, the stem 14, and the moveable face 16, in combination, act as a drive pulley for a drive belt 70, shown in FIGS. 1 and 2, which resides between the two faces (12 and 16). Typically, when the fixed face 12 and the moveable face 16 are at their maximum separation, the drive belt 70 is in close proximity to the stem 14, and the effective pulley radius approaches the radius of the stem 14. When the moveable face 16 is forced closer to the fixed face 12, the shallow conical shape of the faces (12 and 16) forces the drive belt 70 towards the perimeters of the faces (12 and 16), thereby creating a greater effective drive pulley radius. The increased effective drive pulley radius increases the distance travelled by the drive belt 70 for each rotation of the torque converter 10.

Because torque converters such as the torque converter 10 are frequently used in snow-mobiles, which must operate in a wide range of temperature and atmospheric conditions, it is desirable to make the mass of the cam arms 26 adjustable in order to change their moment of inertia to optimize performance of the torque converter 10 for particular conditions.

Classically, the cam arm 26 has been a single solid piece having a fixed mass. If it is desired to adjust the mass or center of gravity to change the moment of inertia of the cam arm 26, the cam arm 26 must be removed from the torque converter 10 and replaced with an alternative cam arm 26 having a different moment of inertia. This requires an inventory of several different size cam arms 26, and requires removal and replacement of the cam arms whenever their moment of inertia is to be changed. Such removal and replacement of the cam arms 26 typically requires either disassembly of the torque converter 10, or, alternatively, special tooling to maintain sufficient separation between the moveable face 16 and the spider casting 18 to allow the cam arms 26 to be slid out of the torque converter 10, after first removing the pivot pins 28.

Several attempts have been made to avoid the inconvenience of needing several sets of cam arms 26 by providing cam arms which include means for altering the mass and the mass distribution of the cam arm. These cam arms, discussed hereafter, are not illustrated.

One means for altering the mass of the cam arms has been the Yamaha® SRX clutch discussed on page 58 of the *Clutch Tuning Handbook* by Olav Aaen, bearing a copyright notice of 1986, and revised 1989, published by Aaen Performance, 316 Sheridan Road, Racine, Wis. 53403. In this device, adjustment of the mass of the cam arm is accomplished by putting rivets of different masses into the cam arm. The rivets are set into three holes provided in the sides of the cam arms, the holes extending parallel to the pivot axis of the cam arm. The rivets may be of different sizes and/or of different materials (i.e. aluminum, steel) in order to vary the mass of the rivets. The use of such rivets still requires the inconvenient disassembly of the torque converter or employment of special tooling in order to adjust the mass.

Another attempt has been the Yamaha® Phazer® clutch, also discussed on page 58 of the *Clutch Tuning Handbook* by Olav Aaen. The Yamaha® Phazer® clutch employs cam arms which are adapted to allow the addition of washers to the cam arms to vary both their mass and their distribution of the mass. The washers are attached by bolts which screw into two threaded recesses provided in the bottom of the centrifugal mass region. While such cam arms will allow both the mass and the distribution of the mass to be varied, they still require either partial disassembly of the torque converter or the employment of special tooling in order to adjust the mass or the distribution of the mass of the cam arms.

U.S. Pat. No. 5,562,555 teaches a means for altering the mass of the cam arms which is similar to the Yamaha® SRX and Phazer® solutions. The '555 patent teaches a torque converter employing cam arms, the mass and/or moment of inertia of which can be adjusted without removal and replacement of the cam arms from the torque converter. However, to do so requires partial disassembly of the torque converter, which is a major undertaking, since the compression spring must be recompressed on assembly. This makes removal of the cam arms a more preferred method for obtaining access to the cam arms.

In one embodiment of the '555 patent, perforations are provided on the distal ends of the centrifugal mass regions of the cam arms to facilitate removing sections of the cam arms to reduce their weight, while lateral bores extending parallel to the pivot axis are provided in the centrifugal mass region, into which a molten weight such as lead may be poured to increase the weight of the cam arms. In another embodiment, the cam arms are provided with lateral bores, again extending parallel to the pivot axis, which accept screw-in or bolt-on shim weights for increasing the mass of the cam arms. While such cam arms allow for adjusting the mass of the cam arms without removal and replacement of the cam arms from the torque converter, they still require the torque converter to be substantially disassembled in order to adjust the mass, and reassembled after the mass of the cam arms has been adjusted.

Thus there is a need for a cam arm, the mass of which can be adjusted without requiring removal of the cam arms, special tooling, or partial disassembly of the torque converter.

SUMMARY OF THE INVENTION

The present invention provides a cam arm for use in a rotary speed regulation device, the mass and center of gravity of which can be adjusted while the cam arm is installed and the speed regulation device is fully assembled. The cam arm has particular utility in a belt drive torque converter such as described in detail above in the Background of the Invention, and discussion will be in terms of such utilization.

Typically, three cam arms are used in the torque converter. As the three cam arms are interchangeable, discussion will be in terms of a single arm.

The cam arm of the present invention shares several common features with the prior art cam arm discussed above. The cam arm has a base region and an elongated centrifugal mass region extending therefrom. A pivot axis passes through the base region, and a pivot pin passage is provided which is aligned with the pivot axis. The cam arm is designed to be mounted in the torque converter on a pivot pin which passes through the pivot pin passage and a cam arm bracket provided in the torque converter. The cam arm bracket is positioned such that the cam arm will be radially mounted with the pivot axis of the cam arm perpendicular to the cam arm when the cam arm is installed.

The centrifugal mass region of the cam arm has a longitudinal axis and terminates in a proximal end, attached to the base region of the cam arm, and a distal end, which forms a free end of the cam arm which, when the cam arm is mounted, is located in a central region of the torque converter. The longitudinal axis of the centrifugal mass region is normal to the pivot axis and is offset therefrom. The offset of the centrifugal mass region from the pivot axis is sufficient to assure that the center of gravity of the cam arm will reside rearward and axially inward of the pivot axis when the torque converter is at rest. Again, for purposes of discussion, the fixed face of the torque converter is defined consistently herein as the front. The centrifugal mass region has a cam surface which forms its rearward edge.

When the cam arm is mounted in the conventional torque converter, the proximal end of the centrifugal mass region is accessible from the periphery of the assembled torque converter through the viewing window of the torque converter. The torque converter typically has three viewing windows, each of which is defined by the rear side of the moveable face, the cam arm bracket, and the spider casting, which collectively form the border of the viewing window.

The improvement of the cam arm of the present invention results from providing an internal cavity residing in the centrifugal mass region of the cam arm. The internal cavity has a cavity opening located in the proximal end of the centrifugal mass region of the cam arm. Means for adding mass to the internal cavity are provided, thereby allowing for changing the mass and center of gravity of the cam arm. A castable material which is poured into the internal cavity can serve as the means for adding mass to the internal cavity.

In a preferred embodiment of the cam arm of the present invention, the internal cavity is an elongated cavity having a central cavity axis which is normal to the pivot axis and, typically, is substantially parallel to the longitudinal axis of the centrifugal mass region. The elongated cavity terminates at the proximal end of the centrifugal mass region in the cavity opening, and has a weight retaining end, preferably located near the distal end of the centrifugal mass region.

For such an elongated cavity, it is preferred for one or more interchangeable weights to be provided, having different masses and/or densities, which serve as the means for adding mass to the elongated cavity. Each of the one or more weights is configured to be insertable into the elongated cavity. Means for rigidly maintaining the one or more interchangeable weights contained in the elongated cavity are provided.

For this embodiment, the mass of the cam arm is adjusted by the insertion into the elongated cavity of one or more of the interchangeable weights. The selection of the one or more interchangeable weights to be used will depend upon the desired mass and distribution of mass sought for particular operating conditions.

The cam arm of the present invention can have its mass and/or its center of gravity adjusted while installed in a fully assembled rotational speed regulation device such as a belt drive variable speed torque converter. When the cam arms are installed, the selected interchangeable weight(s) are installed into the elongated cavity of the cam arm by inserting the selected interchangeable weight(s) into the cavity opening through the viewing window of the rotational speed regulation device, and advancing the selected interchangeable weight(s) to the weight retaining end of the elongated cavity.

It is further preferred for the elongated cavity to be threaded, and for each of the one or more weights to be threaded so as to be threadably engageable with the elongated cavity. The threads provide means for rigidly maintaining the weight(s) in the elongated cavity.

When threaded weights are employed, it is further preferred that a region of the elongated cavity terminating in the cavity opening be enlarged with respect to the threaded portion of the elongated cavity, to facilitate insertion of the threaded weight(s) into the elongated cavity.

The interchangeable weights have different masses and may have different densities. The mass can be varied between the weights by employing weights of different lengths of material having the same density, or weights of the same length of materials of different densities.

The use of weights having different densities allows inserting multiple weights in the elongated cavity and changing the respective locations of the weights to change the center of gravity of the cam arm while maintaining a constant mass.

Preferably, a means for locking the selected interchangeable weight in position when installed in the elongated cavity is provided. Such a means is employed to assure that the selected interchangeable weight will not back out of the elongated cavity under forces and vibrations which are produced when the torque converter is rotated at high speeds. The means for locking the selected interchangeable weight in position can include configuring the weight retaining end to be forcibly engageable with the threaded weight to increase the friction between the threading of the weight and of the elongated cavity. It is also possible to use thread locking substances such as Loctite® to serve as means for locking the selected interchangeable weight in position.

Preferably, a cleaning passage is provided in the centrifugal mass region of the cam arm. The cleaning passage is preferably coaxial with the elongated cavity and communicates between the distal end of the centrifugal mass region and the weight retaining end of the elongated cavity. The cleaning passage allows for removal of debris which might accumulate in the weight retaining end and prevent the selected interchangeable weight from being completely advanced thereto. The cleaning passage is sized somewhat smaller than the elongated cavity, to prevent the selected interchangeable weight from being accidentally advanced beyond the weight retaining end and into the cleaning passage.

BEST MODE OF CARRYING THE INVENTION INTO PRACTICE

Figure 1:
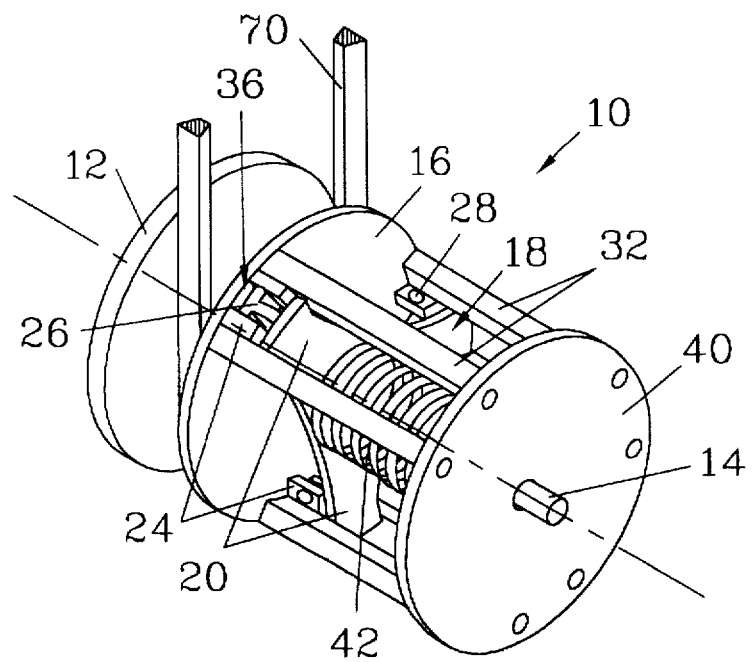
FIG. 1 is an isometric view of a rudimentary prior art belt drive torque converter in which the improved cam arm of the present invention can be employed. The torque converter has three viewing windows, allowing access to a region of each cam arm.
Figure 2:
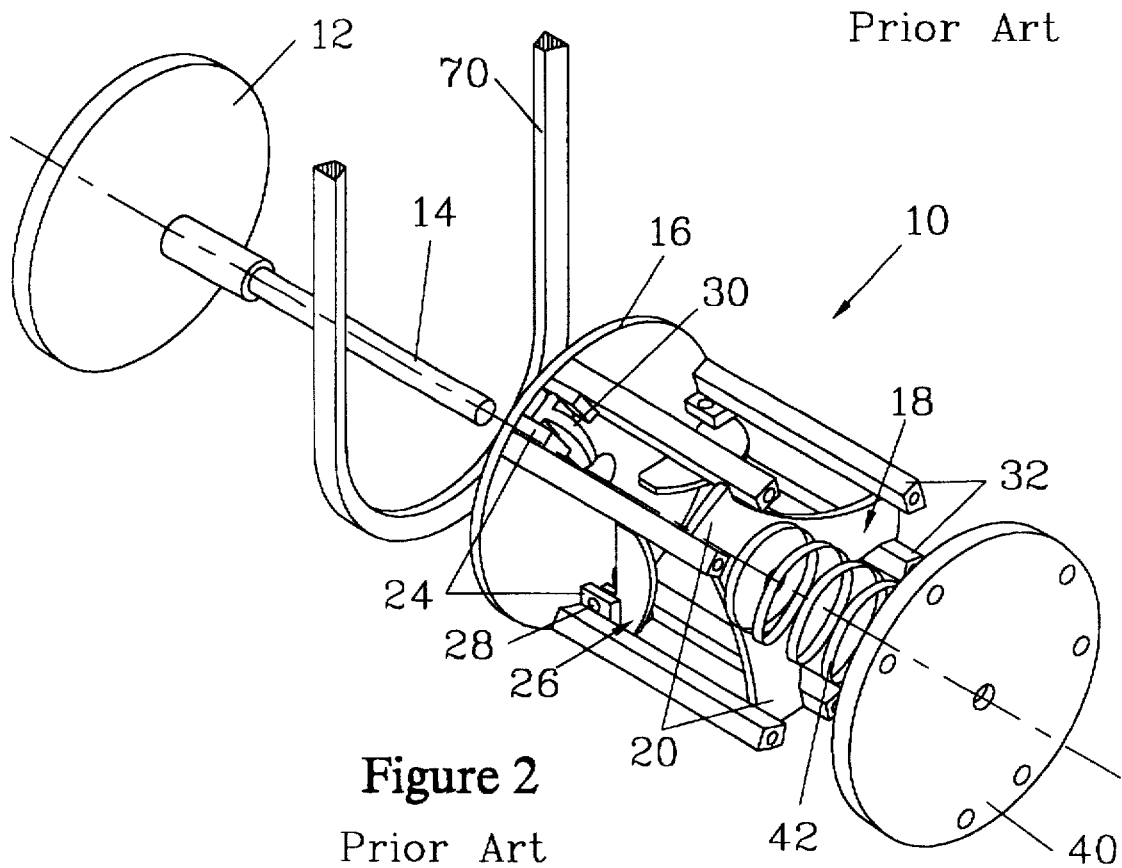
FIG. 2 is an exploded isometric view of the torque converter shown in FIG. 1, showing further details of the structure of the torque converter.
Figure 3:
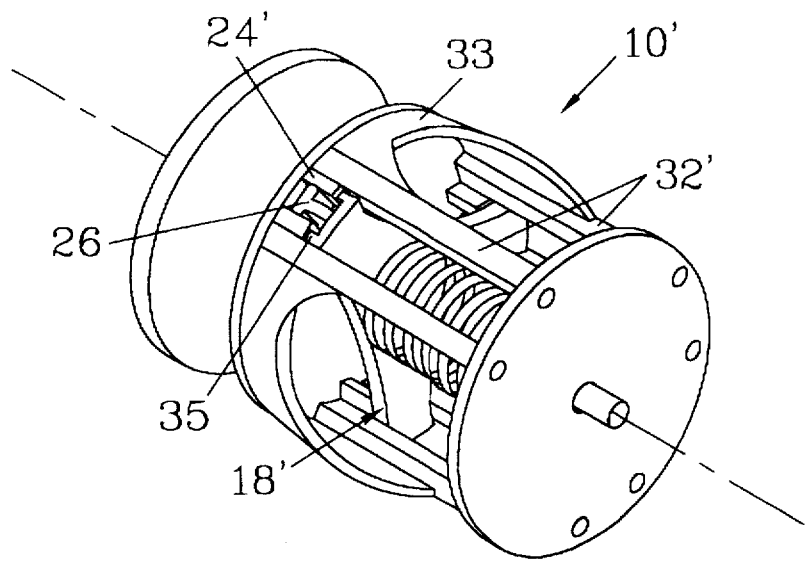
FIG. 3 is an isometric view of another prior art torque converter, with additional elements to increase its structural integrity which are not provided in the rudimentary torque converter illustrated in FIGS. 1 and 2.
Figure 4:
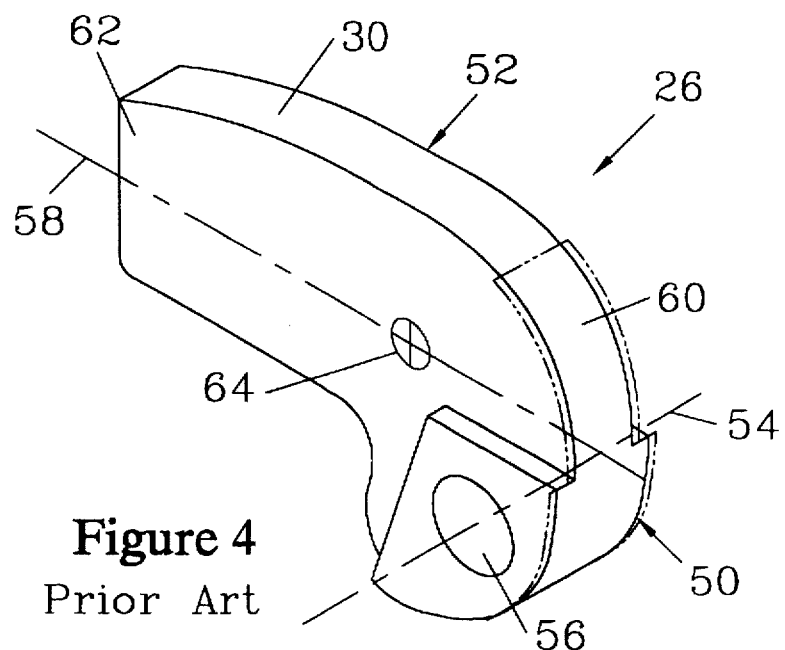
FIG. 4 is an isometric view of a prior art cam arm such as is typically used in the torque converters shown in FIGS. 1, 2, and 3.
Figure 5:
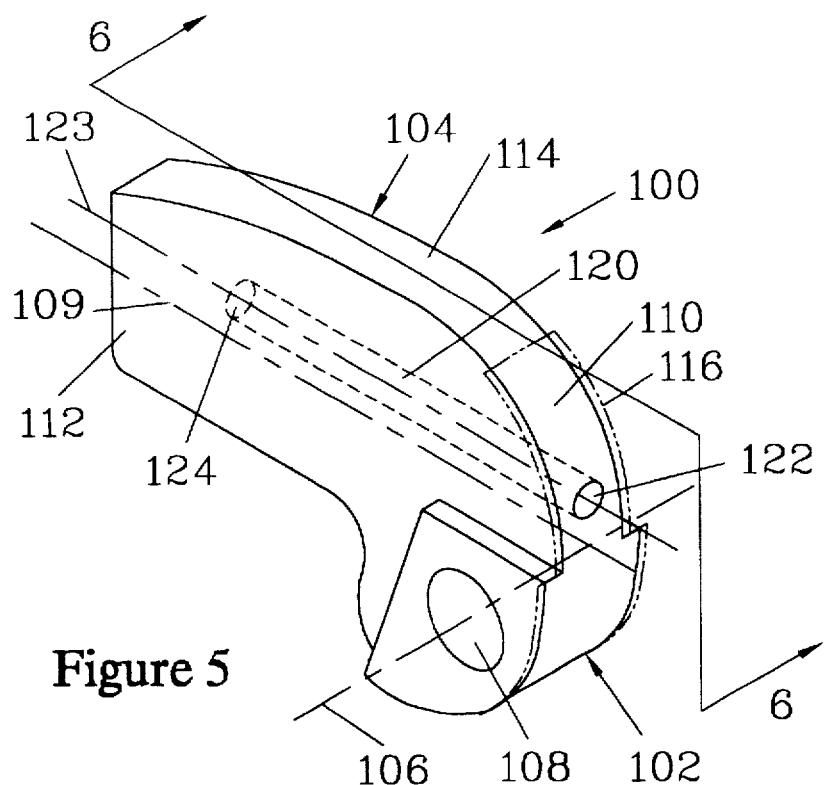
FIG. 5 is an isometric view of an improved cam arm which is one embodiment of the present invention. The improved cam arm has particular utility in the torque converters shown in FIGS. 1, 2, and 3, and replaces the prior art cam arm such as is shown in FIG. 4. The improved cam arm is provided with an internal cavity, having a cavity opening positioned such that it is accessible when the cam arm is installed in the assembled torque converter.

FIG. 5 is an isometric view of a cam arm 100 of one embodiment of the present invention. The cam arm 100 is suitable for use in a belt drive torque converter, such as the torque converter 10 discussed in detail above, in place of the prior art cam arm 26, also discussed above. As does the prior art cam arm 26, the cam arm 100 of the present invention has a base region 102, and an elongated centrifugal mass region 104 extending therefrom. The base region 102 is provided with a pivot axis 106 and an axially aligned pivot pin passage 108, which pass through the base region 102. The centrifugal mass region 104 has a longitudinal axis 109. The centrifugal mass region 104 terminates in a proximal end 110, attached to the base region 102, and a distal end 112, which forms a free end of the centrifugal mass region 104. A cam surface 114 forms the rearward edge of the centrifugal mass region 104. It should be noted that "rearward" as used herein is defined as being consistent with the orientation of the torque converter 10 discussed previously. The centrifugal mass region 104 extends perpendicular to the pivot axis 106 and is offset rearward therefrom. The cam arm 100, when installed in a torque converter such as the prior art torque converter 10, has an access region 116 thereon, which includes the proximal end 110 of the centrifugal mass region 104. The access region 116 is defined by the projection onto the cam arm 100 of the viewing window 36 of the torque converter 10.

The cam arm 100 is provided with an internal cavity 120 in the centrifugal mass region 104. The internal cavity 120 has a cavity opening 122 in the proximal end 110 of the centrifugal mass region 104 and located within the access region 116 of the cam arm 100. It is preferred for the internal cavity 120 to be elongated, having a central cavity axis 123 and extending from the cavity opening 122 longitudinally into the centrifugal mass region 104. The internal cavity 120 terminates at one end in the cavity opening 122, and at the other end in a weight retaining end 124, which is located near the distal end 112 of the centrifugal mass region 104.

Figure 6:
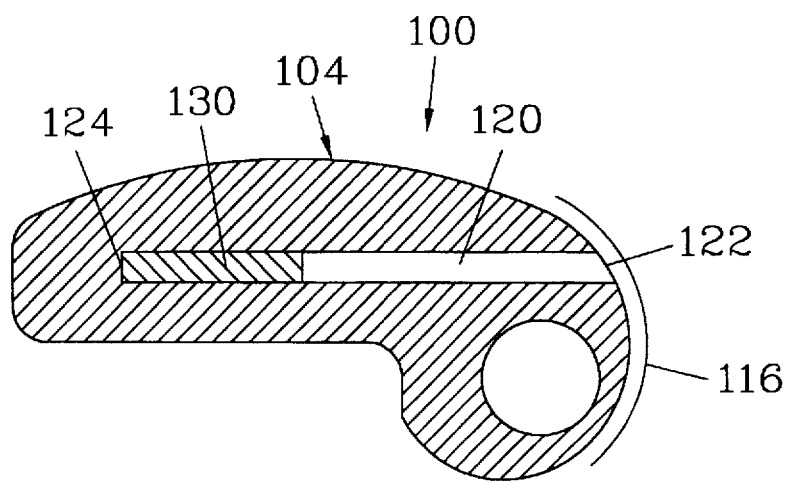
FIG. 6 is a view of the section 6—6 of FIG. 5, showing further details of the internal cavity. In this embodiment, a weight has been cast in the internal cavity to change the mass of the cam arm. Preferably, the cast weight is of a readily machinable material such as lead, which can be machined away to alter the mass.

FIG. 6 is a view of the section 6—6 of FIG. 5, showing further details of the internal cavity 120. A castable material provides a means for adding mass to the internal cavity 120. A measured amount of the castable material is poured into the internal cavity 120 through the cavity opening 122 to form a cast weight 130 in the internal cavity 120. The amount of the material added is selected to provide the desired increase in mass of the cam arm 100. The cam arm 100 is oriented with the cavity opening 122 upwards when pouring the castable material into the internal cavity 120, so that the castable material will flow to the weight retaining end 124. Because the cavity opening 122 is located in the proximal end 110 of the centrifugal mass region 104 and within the access region 116 of the cam arm 100, the castable material may be poured into the cavity opening 122 to form the cast weight 130 while the cam arm 100 remains mounted in the assembled torque converter 10.

The castable material is either a liquid which solidifies upon cooling, such as molten lead, or a material which transforms to a solid as a result of chemical reaction. Preferably, the cast weight 130 adheres to the internal cavity 120 and the adhesion serves as a means for rigidly maintaining the cast weight 130 in the internal cavity 120. The adhesive forces also serve as locking means, preventing the cast weight 130 from backing out of the internal cavity 120 under forces and vibrations produced when the torque converter 10 is rotated at high speeds. Providing a rough or stepped surface on the internal cavity 120 or, alternatively, selecting a casting material which expands as it transforms from a liquid to a solid, will ensure adhesion of the cast weight 130 with the internal cavity 120.

It is further preferred for the cast weight 130 be a readily machinable material such as lead. Selecting a readily machinable material for the cast weight 130 facilitates future reduction in the mass of the cam arm 100 by machining away all or part of the cast weight 130 to remove it from the internal cavity 120.

Figure 7:
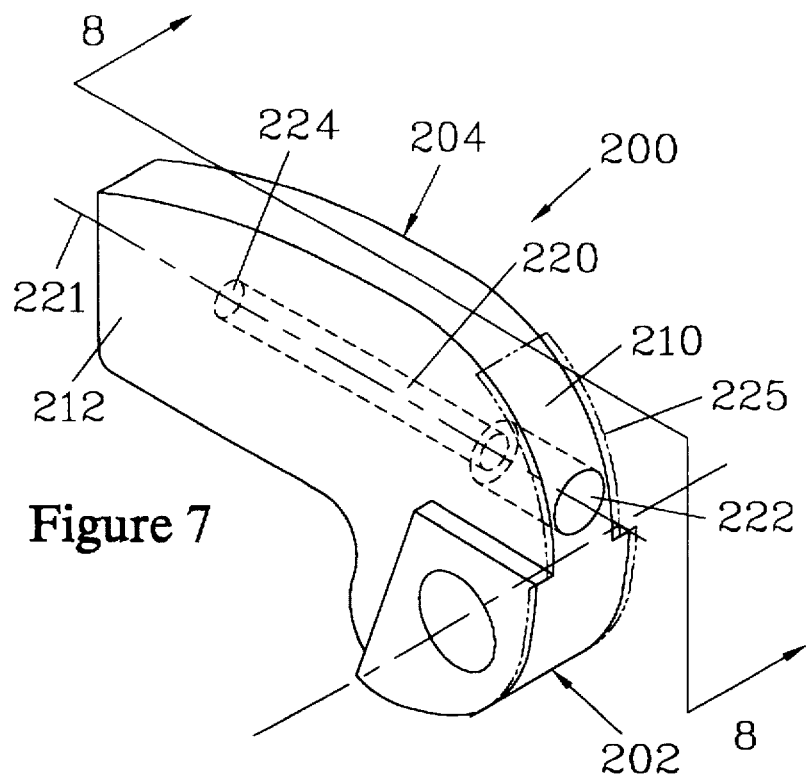
FIG. 7 is an isometric view of an improved cam arm of another embodiment of the present invention. The cam arm is provided with an elongated cavity, having a cavity opening which is accessible when the cam arm is installed in the assembled torque converter. In this embodiment, the cavity opening has a larger cross section than the elongated cavity.

FIG. 7 is an isometric view of a cam arm 200 of another embodiment of the present invention. The cam arm 200 is similar to the cam arm 100 shown in FIGS. 5 and 6. Again, the cam arm 200 has a base region 202, and an elongated centrifugal mass region 204 extending therefrom. The centrifugal mass region 204 terminates in a proximal end 210, attached to the base region 202, and a distal end 212.

The cam arm 200 has an elongated cavity 220 which extends longitudinally into the centrifugal mass region 204. The elongated cavity 220 has a central cavity axis 221 and terminates at one end in a cavity opening 222 in the proximal end 210 of the centrifugal mass region 204, and at the other end in a weight retaining end 224. The cam arm 200, when installed in a torque converter such as the prior art torque converter 10, has an access region 225 which includes the cavity opening 222 in the proximal end 210 of the centrifugal mass region 204 thereby providing access to the cavity opening 222.

Figure 8:
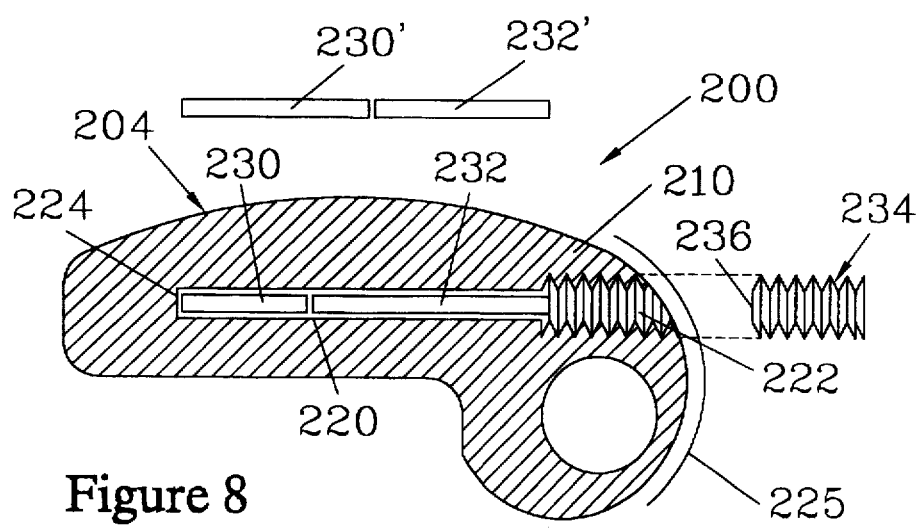
FIG. 8 is a view of the section 8—8 of FIG. 7, showing further details of the elongated cavity. A weight is provided, which may be inserted into the elongated cavity through the cavity opening to change the mass of the cam arm. An endcap is provided which threadably engages the cavity opening and, in combination with a spacer, serves as a means for rigidly maintaining the weight in the elongated cavity.

Referring to FIG. 8, the cavity 220 is in turn sized to accept a weight 230 and, if required, an associated spacer 232, to fill the elongated cavity 220. The associated spacer 232 may be of a lower density than the weight 230, since its primary purpose will be to fill the free space in the elongated cavity 220 without greatly increasing the mass. The weight 230 and, to a lesser extent, the associated spacer 232 provide a means for adding mass to the elongated cavity 220.

The mass of the cam arm 200 may be further adjusted by the insertion into the elongated cavity 220 of an alternate, interchangeable weight 230' and its associated spacer 232'. In either case the weights (230, 230') and their associated spacers (232, 232') are secured by a threaded endcap 234, having an endcap bearing surface 236, which threadably engages the cavity opening 222. The weights (230, 230') are configured to slidably engage the internal cavity 220, as are the associated spacers (232, 232'). The weights (230, 230') and their associated spacers (232, 232') may be inserted through the cavity opening 222 into the elongated cavity 220 of the cam arm 200. Because the cavity opening 222 is located in the proximal end 210 of the centrifugal mass region 204 and within the access region 225 of the cam arm 200 when the cam arm 200 is mounted in the torque converter 10, the selected weight (230 or 230') and its associated spacer (232 or 232') may be inserted into the cavity opening 222 while the cam arm 200 is mounted in the assembled torque converter 10 without removing the cam arm 200 from the torque converter 10 and without disassembling the torque converter 10.

Where the weights (230, 230') and their associated spacers (232, 232') have different densities, it is possible to change the center of gravity of the cam arm 200 while maintaining the same mass by reversing the relative positions of the selected interchangeable weights (230, 230') and their associated spacers (232, 232').

In the embodiment illustrated, where the weights (230, 230') and associated spacers (232, 232') are configured to slidably engage the elongated cavity 220 and be secured therein by the threaded endcap 234, the shape of the weights (230, 230') and the associated spacers (232, 232'), in combination with the endcap 234, provide a means for rigidly maintaining the selected weight (230 or 230') in the weight retaining end 224 of the elongated cavity 220. When the weight (230 or 230') and its associated spacer (232 or 232') have a combined length greater than the distance between the weight retaining end 224 and the endcap bearing surface 236 when the endcap 234 is installed in the cavity opening 222, tightening the endcap 234 will place the selected weight (230 or 230') and its associated spacer (232 or 232') in compression and will increase the frictional force on the threads of the endcap 234. This frictional force provides means for locking the selected weight (230 or 230') in the elongated cavity 220, preventing it from backing out of the elongated cavity 220 under forces and vibrations produced when the torque converter 10 is rotated at high speeds.

Figure 9:
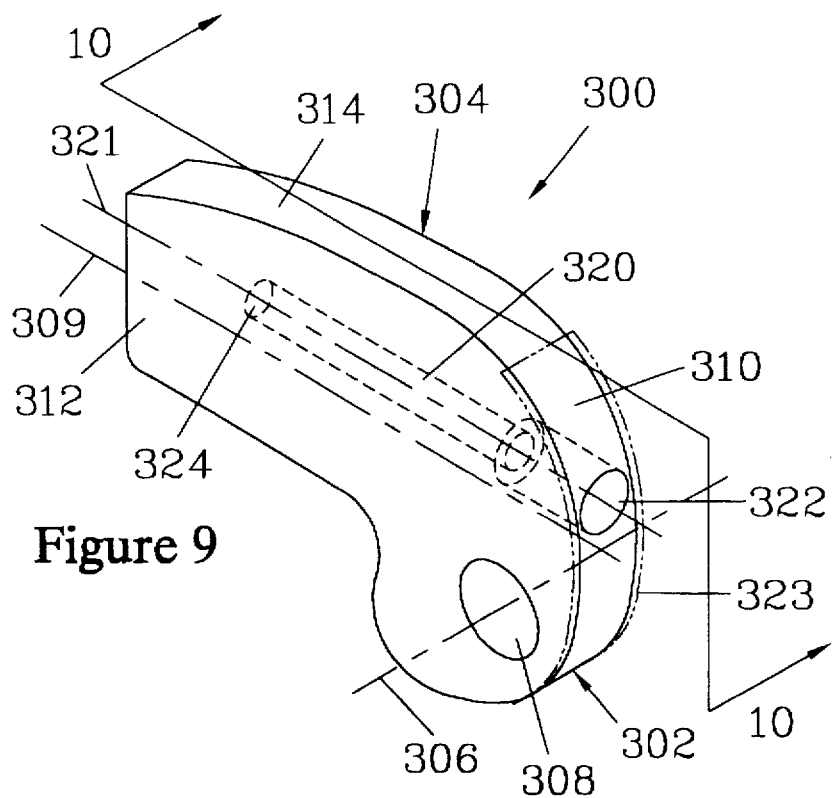
FIG. 9 is an isometric view of an improved cam arm of another embodiment of the present invention. The cam arm is provided with an elongated cavity which is internally threaded.

FIG. 9 is an isometric view of a cam arm 300 of another embodiment of the present invention suitable for use in the torque converter 10. The cam arm 300 has a base region 302, with an elongated centrifugal mass region 304 extending therefrom. In this embodiment the base region 302 and the centrifugal mass region 304 have a common width.

The base region 302 is provided with a pivot axis 306 and an axially aligned pivot pin passage 308 which pass through the base region 302. The centrifugal mass region 304 has a longitudinal axis 309 and terminates in a proximal end 310, attached to the base region 302, and a distal end 312, while a cam surface 314 forms the rearward edge of the centrifugal mass region 304. The centrifugal mass region 304 is normal to the pivot axis 306 and is offset therefrom.

The cam arm 300 is provided with an elongated cavity 320 which is threaded. The elongated cavity 320 has a central cavity axis 321, which extends into the centrifugal mass region 304. The central cavity axis 321 is normal to the pivot axis 306 and is substantially parallel to the longitudinal axis 309 of the centrifugal mass region 304. The elongated cavity 320 terminates at one end in a cavity opening 322 in the proximal end 310 of the centrifugal mass region 304. The cavity opening 322 is unthreaded and larger in diameter than the elongated cavity 320. Since the cavity opening 322 is located in the proximal end 310 of the centrifugal mass region 304, it will reside in an access region 323 of the cam arm 300 and fall within the viewing window 36 of the prior art torque converter 10 when the cam arm 300 is installed in the torque converter 10. The elongated cavity 320 terminates at the other end in a weight retaining end 324, which is located near the distal end 312 of the centrifugal mass region 304.

Figure 10:
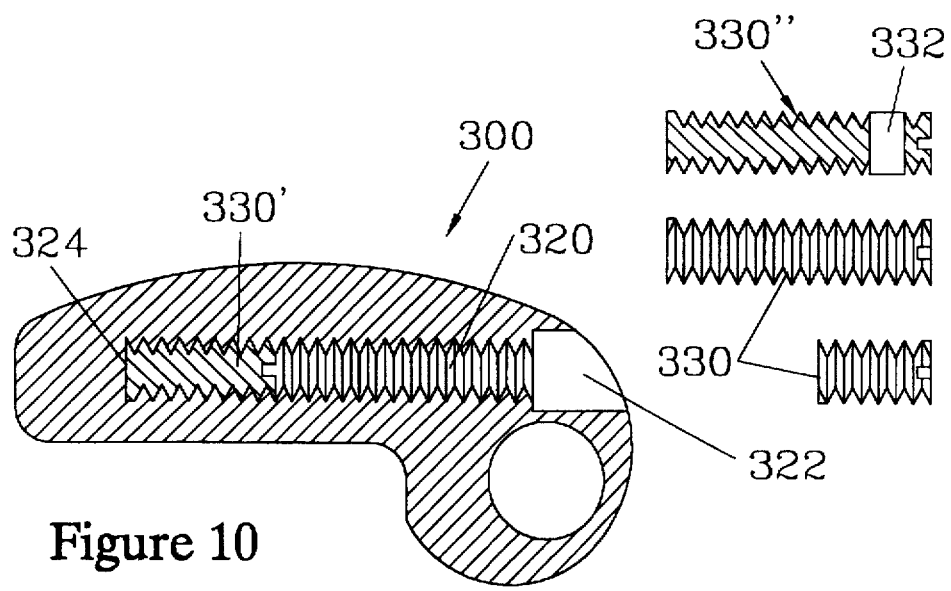
FIG. 10 is a view of the section 10—10 of FIG. 9, showing further details of the internally threaded elongated cavity. A plurality of externally threaded interchangeable weights are provided. To adjust the mass of the cam arm, a selected interchangeable weight is inserted into the cavity opening and threadably engaged with the elongated cavity. The threading provides a means for rigidly maintaining the selected interchangeable weight in the elongated cavity.

As shown in FIG. 10, the cavity opening 322 is preferably sized to guidably accept any one of a plurality of interchangeable threaded weights 330, which serve as means for adding mass to the cam arm 300.

Each of the interchangeable weights 330 is externally threaded to match the threading in the elongated cavity 320. To install a selected interchangeable weight 330', the selected interchangeable weight 330' is inserted into the cavity opening 322 and threadably engaged with the elongated cavity 320. After insertion into the cavity opening 322, the selected interchangeable weight 330' is advanced to the weight retaining end 324 of the threaded elongated cavity 320 by turning it with an allen wrench or screwdriver, depending on the configuration of the selected interchangeable weight 330'.

The interchangeable weights 330 can be constructed of materials having different densities, making it possible to adjust the position of the center of gravity of the cam arm 300 while maintaining the mass constant. The selected interchangeable weight 330' may be replaced by multiple weights having different densities and having a combined mass equalling that of the selected interchangeable weight 330', in which case the order of arrangement of the multiple weights in the elongated cavity 320 will determine the position of the center of gravity of the cam arm 300.

In this embodiment, the threads on the interchangeable weights 330 and the elongated cavity 320 provide a means for rigidly maintaining the selected interchangeable weight 330' in the weight retaining end 324 of the elongated cavity 320 after installation.

It is further preferred to provide a means for locking the selected interchangeable weight 330' in the elongated cavity 320. Such a means can be provided by configuring the weight retaining end 324 so it will be forcibly engaged by the selected interchangeable weight 330' as the selected interchangeable weight 330' is advanced, thereby increasing the friction between the threads on the selected interchangeable weight 330' and the threads on the elongated cavity 320 and preventing the selected interchangeable weight 330' from backing out of the elongated cavity 320.

Alternatively, an adhesive can be applied to the threads of the selected interchangeable weight 330' prior to installation to provide a means for locking the selected interchangeable weight 330' in the elongated cavity 320.

FIG. 10 also shows an alternative interchangeable weight 330", which includes a frictional insert 332 of a deformable material, such as nylon. The frictional insert 332 is configured to deform and frictionally engage the internally threaded elongated cavity 320 when the interchangeable weight 330" is threadably engaged therein. The frictional insert 332 provides a means for locking the interchangeable weight 330" in the elongated cavity 320.

Figure 11:
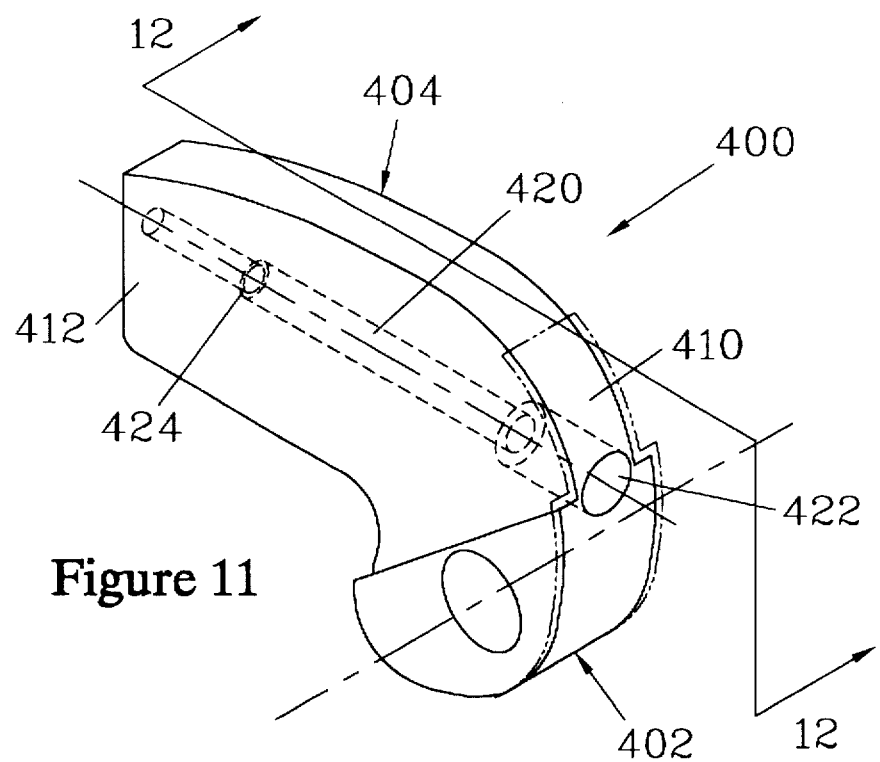
FIG. 11 is an isometric view of an improved cam arm which is another embodiment of the present invention, however is substantially similar to the cam arm shown in FIGS. 9 and 10. The cam arm is again provided with an internally threaded elongated cavity, but additionally has a cleaning passage. The cleaning passage communicates with the elongated cavity to facilitate the removal of debris from the elongated cavity.

FIG. 11 is an isometric view of a cam arm 400, which is similar to the cam arm 300 of FIGS. 9 and 10. The cam arm 400 has a base region 402, and an elongated centrifugal mass region 404 extending therefrom. In this embodiment, the base region 402 is wider than the centrifugal mass region 404.

The centrifugal mass region 404 terminates in a proximal end 410, attached to the base region 402, and a distal end 412. The cam arm 400 has an elongated cavity 420 which extends into the centrifugal mass region 404. The elongated cavity 420 is internally threaded and terminates at one end in a cavity opening 422, located in the proximal end 410 of the centrifugal mass region 404, and at the other end in a weight retaining end 424, which is located near the distal end 412 of the centrifugal mass region 404.

Figure 12:
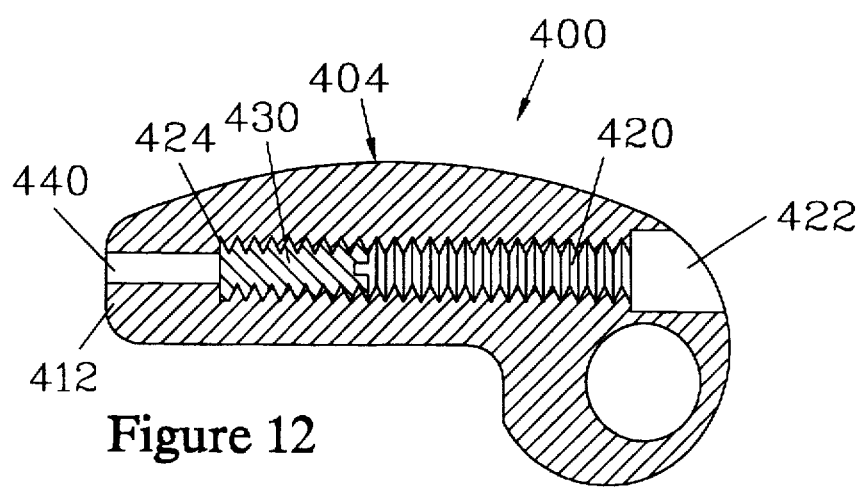
FIG. 12 is a view of the section 12—12 of FIG. 11, showing further details of the elongated cavity and the cleaning passage.

Referring to FIG. 12, the cavity opening 422 is sized to guidably accept an externally threaded weight 430, directing the weight 430 into the elongated cavity 420. The weight 430 provides a means for adding mass to the elongated cavity 420.

The cam arm 400 has a cleaning passage 440 in the centrifugal mass region 404. The cleaning passage 440 communicates between the distal end 412 of the centrifugal mass region 404 and the weight retaining end 424 of the elongated cavity 420. The cleaning passage 440 is smaller in diameter than the elongated cavity 420, to prevent the weight 430 from accidentally being advanced into the cleaning passage 440, but is sufficiently large to facilitate removal of debris which might accumulate at the weight retaining end 424.

The elongated cavity 420 and the cleaning passage 440 may readily be provided by drilling a hole completely through the centrifugal mass region 404 and then threading a portion of the hole with a tap. The threaded portion then forms the internally threaded elongated cavity 420, with the weight retaining end 424 being defined by the point at which the threading stops. The unthreaded portion of the hole then forms the cleaning passage 440. The cavity opening 422 can be counterbored to guidably accept the weight 430.

While the novel features of the present invention have been described in terms of particular embodiments and preferred applications, it should be appreciated by one skilled in the art that substitution of materials and modification of details obviously can be made without departing from the spirit of the invention.

What I claim is:

1. An improved cam arm for use in a rotational speed regulation device, the cam arm having,
    a base region having a pivot axis through which a pivot pin passes to allow for pivotable mounting of the cam arm to the rotational speed regulation device,
    an elongated centrifugal mass region terminating in a proximal end which is attached to the base region of the cam arm, and a distal end which forms a free end of the elongated centrifugal mass region, the elongated centrifugal mass region also having a longitudinal axis which is offset with respect to the pivot axis of the cam arm and extending normal thereto,
  the improvement comprising:
    an internal cavity located in the centrifugal mass region of the cam arm and having a cavity opening located in the proximal end of the centrifugal mass region; and
    means for adding mass to said internal cavity.

2. The improved cam arm of claim 1 wherein said internal cavity is an elongated internal cavity, having a cavity axis which is substantially normal to the pivot axis, further wherein said means for adding mass to said internal cavity comprises:
    at least one weight, said at least one weight being configured to be insertable into said elongated internal cavity; and
    means for rigidly maintaining said at least one weight in said elongated internal cavity.

3. The improved cam arm of claim 2 wherein at least a portion of said elongated internal cavity is internally threaded and said means for rigidly maintaining said at least one weight in said elongated internal cavity further comprises:
    external threads on said at least one weight configured to be threadably engageable with the internal threads in said elongated internal cavity.

4. The improved cam arm of claim 3 further wherein said cavity opening is enlarged to guide said at least one weight into said elongated internal cavity.

5. The improved cam arm of claim 4 further comprising:
    means for locking said at least one weight in position when installed in said elongated internal cavity.

6. The improved cam arm of claim 5 further comprising:
    a cleaning passage connecting said elongated internal cavity to the distal end of the centrifugal mass region of the cam arm.

7. The improved cam arm of claim 6 wherein said means for locking said at least one weight in position when installed in said elongated internal cavity is provided by a weight retaining end provided in said elongated internal cavity, said weight retaining end being configured to be forcibly engaged by said at least one weight.

8. The improved cam arm of claim 6 wherein said means for locking said at least one weight in position when installed in said elongated internal cavity is provided by a frictional insert of a deformable material in said at least one weight.

9. The improved cam arm of claim 2 wherein said at least one weight is configured as a rod.

10. The improved cam arm of claim 9 wherein said means for rigidly maintaining said at least one weight in said elongated internal cavity further comprises:

an endcap configured to threadably engage said internal cavity opening and having an endcap bearing surface; and, a spacer configured to span between said endcap bearing surface and said at least one weight when said endcap is threadably engaged with said cavity opening and said at least one weight is in said elongated internal cavity.

11. The improved cam arm of claim 1 wherein said means for adding mass to said internal cavity further comprises:

a cast weight which is poured into said internal cavity and solidifies thereafter.

12. The improved cam arm of claim 11 wherein said cast weight is machinable.

13. An improved torque converter having at least one cam arm, the torque converter having at least one viewing window allowing direct access to the at least one cam arm when the torque converter is at rest, each of the at least one cam arms having, a base region having a pivot axis through which a pivot pin passes, an elongated centrifugal mass region having terminating in a proximal end which is attached to the base region of the cam arm, and a distal end which forms a free end of the elongated centrifugal mass region, the elongated centrifugal mass region also having a longitudinal axis which is offset with respect to the pivot axis of the cam arm and extending normal thereto, the at least one cam arm being designed for pivotably mounting on the pivot pin which in turn mounts in a cam arm bracket provided in the torque converter, the at least one cam arm pivoting between a rest position, wherein an access region of the at least one cam arm is viewable from the viewing window, and an operating position, where the at least one cam arm resides when the torque converter is rotating, the improvement comprising:

an elongated internal cavity in the at least one cam arm, said elongated internal cavity being located in the centrifugal mass region of the at least one cam arm and terminating in a cavity opening residing in the access region of the at least one cam arm;

at least one weight which is configured to be insertable into said elongated internal cavity; and means for rigidly maintaining said at least one weight in said elongated internal cavity.

14. The improved torque converter of claim 13 wherein at least a portion of said elongated internal cavity has internal threads and said means for rigidly maintaining one of said interchangeable weights in said elongated internal cavity further comprises:

external threads on each of said interchangeable weights configured to be threadably engageable with said internal threads in said elongated internal cavity.

15. The improved torque converter of claim 14 wherein each of the at least one cam arms further comprises:

a cleaning passage connecting said elongated internal cavity to the distal end of the centrifugal mass region of the cam arm.

16. An improved belt drive variable speed torque converter, the torque converter having, a fixed face shaped as a shallow cone and affixed to a coaxial stem which in turn is coupled to a driver of an engine, a moveable face which slidably engages the stem so as to be coaxial with and movable with respect to the fixed face, the moveable face being shaped as a shallow cone with its vertex opposed to that of the fixed face, a spider casting is fixably positioned on the stem in a fixed apart relationship to the fixed face with the moveable face positioned therebetween, the spider casting having at least three lobes, at least three cam arm brackets positioned on the moveable face and opposed to the lobes of the spider casting.

a cam arm pivotably attached to each of the cam arm brackets by a pivot pin, the cam arm having, a base region having a pivot axis through which a pivot pin passes to allow for pivotable mounting of the cam arm to the cam arm bracket, and an elongated centrifugal mass region terminating in a proximal end which is attached to the base region of the cam arm and a distal end which forms a free end of the centrifugal mass region, the centrifugal mass region having a longitudinal axis which is offset with respect to the pivot axis and extends normal thereto, spacer posts projecting from the moveable face and slidably engaging the lobes of the spider casting, the spider casting, the cam arm brackets, and the spacer posts defining borders of viewing windows through which the corresponding cam arms may be accessed, a cover plate affixed to the spacer posts and maintained at a fixed separation from the moveable face with the spider casting being positioned therebetween, and a compression spring residing between the spider casting and the cover plate, and surrounding the stem, the compression spring engaging the spider casting and the cover plate to bias them towards a maximum separation from each other, the improvement comprising:

an internal cavity located in the centrifugal mass region of the cam arm and having a cavity opening located in the proximal end of the centrifugal mass region, said internal cavity allowing for the addition of mass to the cam arm; and means for adding mass to said internal cavity.

17. The improved torque converter of claim 16 wherein said internal cavity of the cam arm is an elongated internal cavity, having a cavity axis which is substantially normal to the pivot axis of the cam arm, further wherein said means for adding mass to said internal cavity comprises:

at least one weight, said at least one weight being configured to be insertable into said elongated internal cavity; and means for rigidly maintaining said at least one weight in said elongated internal cavity.

18. The improved torque converter of claim 17 wherein at least a portion of said elongated internal cavity of the cam arm has internal threads and said means for rigidly maintaining said at least one weight in said elongated internal cavity further comprises:

external threads on said at least one weight configured to be threadably engageable with the internal threads in said elongated internal cavity.

19. The improved torque converter of claim 18 wherein said cavity opening of said elongated internal cavity of the cam arm is enlarged to guide said at least one weight into said elongated internal cavity, the cam arm further comprising:

means for locking said at least one weight in position when installed in said elongated internal cavity; and a cleaning passage connecting said elongated internal cavity to the distal end of the centrifugal mass region of the cam arm.

* * * * *

UNITED STATES PATENT AND TRADEMARK OFFICE
CERTIFICATE OF CORRECTION

PATENT NO. : 5,795,255
DATED : August 18, 1998
INVENTOR(S) : John P. Hooper

It is certified that error appears in the above-identified patent and that said Letters Patent is hereby corrected as shown below:

<u>Column 13,</u>
Line 21, before "terminating", delete "having".

Signed and Sealed this

Seventh Day of May, 2002

*Attest:*

JAMES E. ROGAN
*Attesting Officer*     *Director of the United States Patent and Trademark Office*